March 28, 1967  K. E. SEITTER  3,311,006
LATHE CENTER

Original Filed April 28, 1958  2 Sheets-Sheet 1

INVENTOR
KARL E. SEITTER

BY Dicke and Craig

ATTORNEYS

March 28, 1967  K. E. SEITTER  3,311,006
LATHE CENTER

Original Filed April 28, 1958  2 Sheets-Sheet 2

INVENTOR
KARL E. SEITTER

BY Dicke and Craig

ATTORNEYS

United States Patent Office 3,311,006
Patented Mar. 28, 1967

3,311,006
LATHE CENTER
Karl E. Seitter, Thielenbrucher Allee 36,
Cologne-Dellbruck, Germany
Continuation of abandoned application Ser. No. 731,198, Apr. 28, 1958. This application Jan. 23, 1964, Ser. No. 339,697
4 Claims. (Cl. 82—40)

The present application is a continuation application of my copending application Ser. No. 731,198 filed Apr. 28, 1958 and now abandoned.

The present invention relates to new improvements in work-driving centers for lathes and similar machine tools.

Prior to this invention there have been work-driving centers in which the center itself and the work-driving dogs or the like communicate with each other so as to attain an equalization of pressure, for example, by mechanical or hydraulic means, so that the movements of the center caused by mounting a workpiece will be transmitted to the work-driving dogs until the latter engage with and take along the workpiece. Such a design of a driving center has, however, the disadvantage that, for example, if a series of workpieces which are to be mounted successively in a lathe have centering bores of different depths, the end surfaces of such workpieces will be shifted accordingly in the axial direction with the result that it will be practically impossible to turn the workpieces uniformly and accurately by moving the cutting tool up to a fixed stop.

It is an object of the present invention to overcome these disadvantages by providing a driving center in which the longitudinal movements of the center itself are independent of the movements of the work-driving dogs or the like. For this purpose, the present invention provides a center housing in which the center itself is acted upon by spring pressure and is movable in the axial direction and in which the driving dogs are equidistantly distributed in the peripheral direction of the housing and are mounted therein so as to be jointly slidable parallel to the center against a hydraulic back pressure but independently of the sliding movement of the center. Such back pressure is preferably produced and constantly maintained by means of springs acting upon the individual driving dogs independently of the pressure thereon by the mounted workpiece.

Such a joint pressure of the driving dogs which is equalized by means of communicating channels within the housing connecting the individual pressure chambers of the driving dogs with each other, is of decisive importance for the proper functioning of the driving center according to the invention. Such equalized pressure always results in a constant axial position of the workpiece, permitting an exactly uniform turning of a series of workpieces which are driven by a center with driving dogs.

These and other features of the present invention will become more apparent from the following detailed description thereof, particularly when read with reference to the accompanying drawings, in which FIGURE 1 shows a longitudinal section of a driving center according to the invention;

FIGURE 3 shows a longitudinal section of a driving center according to a modification of the invention; while

Figure 1:
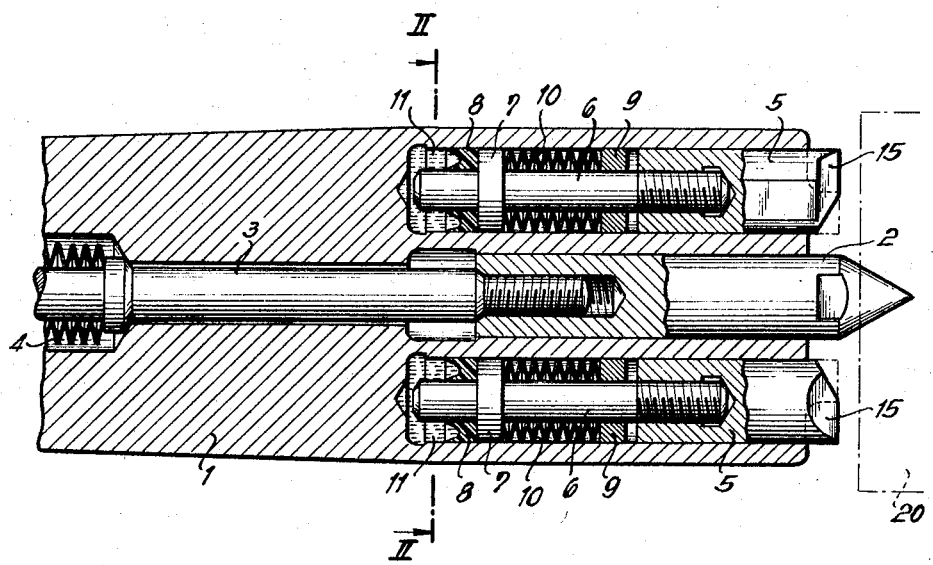
Figure 2:
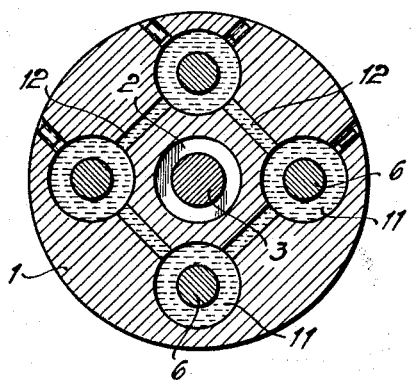
FIGURE 2 shows a cross section taken along line II—II in FIGURE 1.

Referring to the drawings and first particularly to FIGURES 1 and 2, the center housing 1 has slidably mounted therein a center 2, the inner end of which is screwed upon a shaft 3 which is acted upon by compression springs 4. When a workpiece 20 is being mounted on the lathe, center 2 will be shifted in the axial direction against the pressure of springs 4 which is preferably made adjustable.

Entirely independent of center 2, housing 1 carries a plurality of driving dogs 5, for example, four, the tips or blades 15 of which are preferably exchangeable. Dogs 5 are made in the form of pistons, each of which carries at its rear end a shaft 6 with a collar 7 thereon. The front side of each collar 7 is acted upon by cup springs 10 which rest upon a stop ring 9 which is rigidly secured to the housing. At the other side of collar 7, each shaft 6 carries a suitable packing ring 8 which seals the pressure chamber 11 toward the front. As shown in FIGURE 1, these packing rings are preferably provided with annular grooves so that the pressure fluid in chambers 11 will enter into such grooves and press the packing material in a radial direction against the surfaces to be sealed. Pressure chambers 11 communicate with each other through connecting channels 12 in housing 1 so that the same pressure will be maintained in all pressure chambers.

If one of a series of workpieces 20 with straight end surfaces is being mounted in the lathe, center 2 will retract until dog blades 15 can engage with and take along the workpiece 20. Because of the equalization of pressure in pressure chambers 11, the workpieces 20 will always be driven properly and without change in their axial position since dogs 5 will also function as stops. If workpieces 20 with uneven or inclined end surfaces are to be mounted in the lathe, such end surface will at first be engaged only by one of the dog blades 15. However, because of the equalization of pressure between all of the dogs, this first dog 5 will be depressed until all of the dogs 5 are in engagement with the workpiece and will jointly drive the same. Therefore, even in such a case, dogs 5 will function as a constant stop in an axial position which is set automatically. Consequently, a series of workpieces may be turned very accurately and uniformly.

Figure 3:
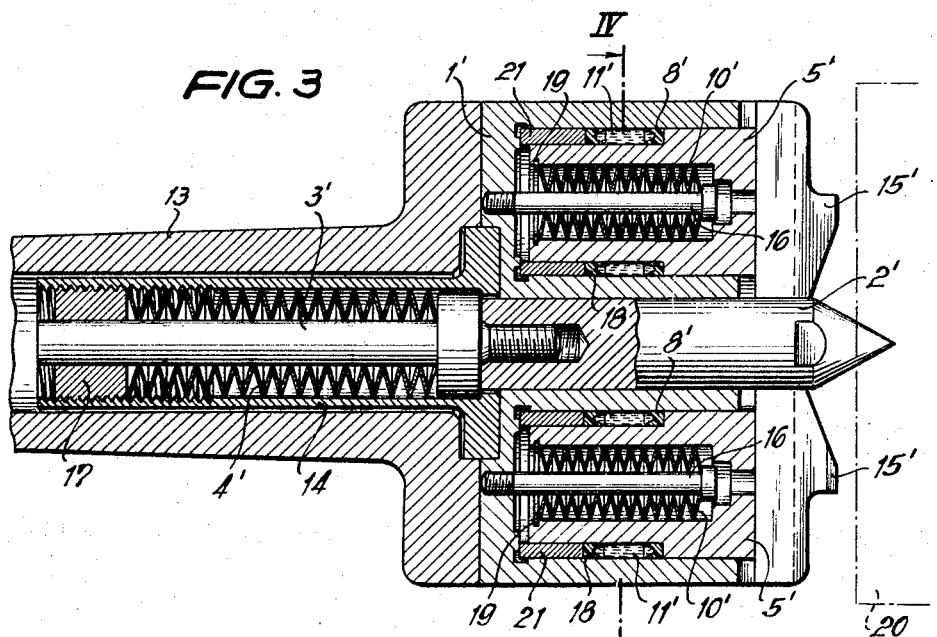
Figure 4:
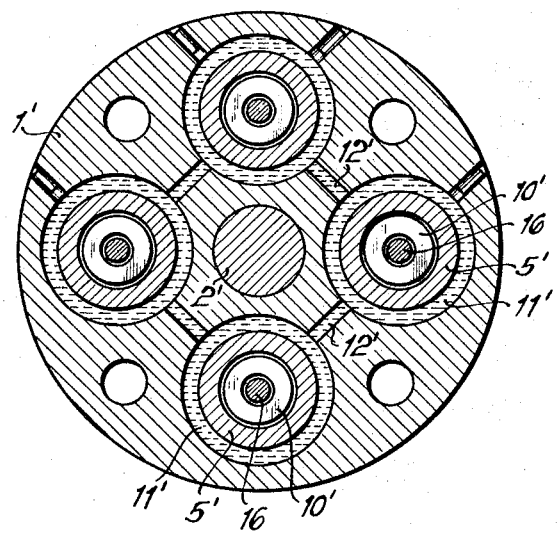
FIGURE 4 shows a cross section taken along line IV–IV in FIGURE 3.

The modification of the invention as illustrated in FIGURES 3 and 4, shows a driving center of a larger design in which the housing 1' is provided with a special shaft 13 which may be conical, into which a tubular sleeve 14 is inserted which contains the compression springs 4'. The tension of springs 4' may be adjusted by a setscrew 17 which is slipped over the rear end of the spring shackle bolt 3'.

The individual dog members 5' of this construction are of a greater diameter than those shown in FIGURES 1 and 2 and are of a hollow pistonlike shape. The cup springs 10' are mounted within these pistons 5' and act at one end upon snap rings 19 which are set into the inner walls of pistons 5', and at the other end upon the heads of shackle bolts 16. These bolts are screwed into housing 1' and may be adjusted to vary the spring tension of the individual dogs 5'. The tips or blades 15' carried by the dogs 5', like the corresponding members 15 of FIGURE 1, are preferably exchangeable.

The rear part of the individual dog pistons 5' is made of a smaller outer diameter to provide an annular space for receiving grooved packing rings 8' and 18 at opposite sides of pressure chambers 11'. Packing rings 18 rest upon sleeves 21 which are fitted into housing 1'. Pressure chambers 11' communicate with each other through connecting channels 12' in housing 1'. Although differing in design, the operation of the driving center according to FIGURES 3 and 4 is the same as that of the center illustrated in FIGURES 1 and 2.

Although my invention has been illustrated and described with reference to the preferred embodiments thereof, I wish to have it understood that it is in no way limited to the details of such embodiments, but is capable of numerous modifications within the scope of the appended claims.

I claim:

1. A lathe center for driving a workpiece, comprising a housing, a center slidably mounted for substantially free longitudinal movement within a bore provided in said housing, means acting upon said center to urge said center in a forward direction, a plurality of work-driving dogs including piston means, cylinder means within said housing for slidingly receiving therein said piston means, connecting means interconnecting said cylinder means to provide a common hydraulic system hermetically sealed against said bore and adapted to be hermetically sealed against the outside, said common hydraulic system effectively providing interconnected pressure chambers disposed rearwardly of said piston means to thereby urge said work-driving dogs in said forward direction in the presence, within said pressure chambers, of a hydraulic fluid under pressure, seal means provided with annular grooves effectively forming lip portions within said pressure chambers in sealing abutment against the end surfaces of said piston means exposed to the corresponding pressure chamber so as to urge said lip portions radially into sealing engagement with the walls of said cylinder means when acted upon by the hydraulic fluid under pressure within said pressure chambers, and yieldable means operatively associated with said common hydraulic system for continuously maintaining under pressure the hydraulic fluid within said pressure chambers to subject said piston means to a predetermined hydraulic prestress condition and simultaneously effecting thereby a tight self-sealing action by said seal means.

2. In a lathe center for driving a workpiece and comprising a housing provided with a center bore and a plurality of bores forming cylinder means with the axes thereof disposed substantially parallel to the axis of the lathe center and distributed substantially uniformly about the axis of the lathe center, a center slidably mounted within said center bore, spring means acting on said center and operative to normally urge the tip of said center in a forward direction out of said housing, a plurality of work-driving dog-like structures slidingly received within a respective one of said plurality of bores and each including a work-engaging part operable to project from said cylinder means to the outside of said housing and piston means slidingly guided within a respective cylinder means and operatively associated with a corresponding work-engaging part, the portion of the cylinder means disposed to the rear of said piston means forming pressure chambers so as to urge said work-engaging parts in said forward direction in the presence, within said pressure chambers, of a hydraulic fluid under pressure acting on the rear sides of said piston means, the improvement essentially consisting of connecting means operatively interconnecting all of said pressure chambers exclusive of said center bore to provide a common hydraulic pressure system for all of said piston means which is hermetically sealed with respect to said center bore and said center as well as the spring means thereof, a hydraulic pressure fluid within said common hydraulic pressure system, and additional yieldable means within said housing separate from said first-mentioned spring means and operatively associated with said piston means for effectively acting upon each of said piston means in the rearward direction thereof to continuously maintain an equal pressure in all of said pressure chambers independently of any force applied against any work-engaging part whereby said center, on the one hand, and said work-engaging part, on the other, operate completely independently of one another, at least one grooved packing ring within each of said pressure chambers having annular projecting lips adapted to be pressed by the pressure fluid against the walls of the respective pressure chamber and of said piston means for tightly sealing the corresponding pressure chamber at all times, stop means within each of said cylinder means and rigidly secured to the walls thereof, each of said piston means including a rod secured to the rear end of a respective work-engaging part of a corresponding work-driving dog-like structure and slidably extending through said stop means and into a respective one of said cylinder means, and a respective piston means being secured to said rod intermediate its ends and being of a diameter substantially corresponding to the inner diameter of said cylinder means and slidable along the walls thereof, a respective one of said packing rings being mounted on the rear side of said piston means with the projecting lips of the ring facing toward said pressure chamber and in sealing engagement with said piston rod and the walls of said cylinder means, and said additional yieldable means including spring means composed of a series of annular cup springs on said piston rod within a respective cylinder means and engaging at one end upon the rear side of said stop means and acting at the other end upon the front side of said piston means.

3. In a lathe center for driving a workpiece and comprising a housing provided with a center bore and a plurality of bores forming cylinder means with the axes thereof disposed substantially parallel to the axis of the lathe center and distributed substantially uniformly about the axis of the lathe center, a center slidably mounted within said center bore, spring means acting on said center and operative to normally urge the tip of said center in a forward direction out of said housing, a plurality of work-driving dog-like structures slidingly received within a respective one of said plurality of bores and each including a work-engaging part operable to project from said cylinder means to the outside of said housing and piston means slidingly guided within a respective cylinder means and operatively associated with a corresponding work-engaging part, the portion of the cylinder means disposed to the rear of said piston means forming pressure chambers so as to urge said work-engaging parts in said forward direction in the presence, within said pressure chambers, of a hydraulic fluid under pressure acting on the rear sides of said piston means, the improvement essentially consisting of connecting means operatively interconnecting all of said pressure chambers exclusive of said center bore to provide a common hydraulic pressure system for all of said piston means which is hermetically sealed with respect to said center bore and said center as well as the spring means thereof, a hydraulic pressure fluid within said common hydraulic pressure system, and additional yieldable means within said housing separate from said first-mentioned spring means and operatively associated with said piston means for effectively acting upon each of said piston means in the rearward direction thereof to continuously maintain an equal pressure in all of said pressure chambers independently of any force applied against any work-engaging part whereby said center, on the one hand, and said work-engaging part, on the other, operate completely independently of one another, at least one grooved packing ring within each of said pressure chambers having annular projecting lips adapted to be pressed by the pressure fluid against the walls of said pressure chamber and of said piston means for tightly sealing the respective pressure chamber at all times, and each of said piston means including a cylindrical member having a front part of a diameter substantially corresponding to the inner diameter of a respective cylinder means and slidable along the walls thereof, and having a rear part of smaller diameter and a shoulder separating said front and rear parts, said rear part together with the walls of the corresponding cylinder means defining an annular chamber forming the corresponding pressure chamber, said piston means having an axial bore, a spring ring snapped into an annular groove in the walls of said piston bore near the rear end of said piston, and said additional yieldable means including additional spring means composed of a series of annular cup springs within said bore, a bolt within said bore and extending through said cup springs and secured at the rear end thereof to the bottom of said cylinder means formed by the housing, each of said cup springs engaging at one end upon said spring ring and at the other end upon the head of said bolt, a cylindrical sleeve within said cylinder means and engaging the cylinder bottom and disposed about said rear piston part to guide the same, said packing rings being mounted within said annular pressure chamber, one of said rings engaging said shoulder and the other ring engaging the front end of said sleeve, said lips of both of said packing rings facing toward each other and engaging said rear piston part and said cylinder walls so as to seal said pressure fluid within said pressure chamber.

4. In a lathe center for driving a workpiece and comprising a housing provided with a center bore and a plurality of bores forming cylinder means with the axes thereof disposed substantially parallel to the axis of the lathe center and distributed substantially uniformly about the axis of the lathe center, a center slidably mounted within said center bore, spring means acting on said center and operative to normally urge the tip of said center in a forward direction out of said housing, a plurality of work-driving dog-like structures slidingly received within a respective one of said plurality of bores and each including a work-engaging part operable to project from said cylinder means to the outside of said housing and piston means slidingly guided within a respective cylinder means and operatively associated with a corresponding work-engaging part, the portion of the cylinder means disposed to the rear of said piston means forming pressure chambers so as to urge said work-engaging parts in said forward direction in the presence, within said pressure chambers, of a hydraulic fluid under pressure acting on the rear sides of said piston means, the improvement essentially consisting of connecting means operatively interconnecting all of said pressure chambers exclusive of said center bore to provide a common hydraulic pressure system for all of said piston means which is hermetically sealed with respect to said center bore and said center as well as the spring means thereof, a hydraulic pressure fluid within said common hydraulic pressure system, and additional yieldable means within said housing separate from said first-mentioned spring means and operatively associated with said piston means for effectively acting upon each of said piston means in the rearward direction thereof to continuously maintain an equal pressure in all of said pressure chambers independently of any force applied against any work-engaging part whereby said center, on the one hand, and said work-engaging part, on the other, operate completely independently of one another, at least one grooved packing ring within each of said pressure chambers having annular projecting lips adapted to be pressed by the pressure fluid against the walls of the respective pressure chamber and of said piston means for tightly sealing the corresponding pressure chamber at all times, a respective one of said packing rings being mounted on the rear side of said piston means with the projecting lips of the ring facing toward said pressure chamber and in sealing engagement with the walls of said cylinder means.

References Cited by the Examiner
UNITED STATES PATENTS

| | | | |
|---|---|---|---|
| 2,250,634 | 7/1941 | Groene | 82—40 |
| 2,402,979 | 7/1946 | Barto | 82—33 |
| 2,897,708 | 8/1959 | Kostyrka | 82—33 |
| 2,909,955 | 10/1959 | Williams | 82—40 |
| 2,971,413 | 2/1961 | Rohn | 82—33 |

WILLIAM W. DYER, JR., *Primary Examiner.*

LEONIDAS VLACHOS, *Examiner.*